United States Patent [19]

Kassaseya

[11] Patent Number: 5,638,742
[45] Date of Patent: Jun. 17, 1997

[54] POULTRY SUPPORT RACK

[76] Inventor: Violette Kassaseya, 224 S. Ardmore Ave., Los Angeles, Calif. 90004

[21] Appl. No.: 701,116

[22] Filed: Aug. 21, 1996

[51] Int. Cl.⁶ .............................. A47J 37/04; A47J 37/12; A47J 43/00; A47J 43/18
[52] U.S. Cl. .................... 99/426; 99/449; 211/181.1
[58] Field of Search ............... 99/426, 448–45 D, 99/419–421 V, 394, 444–446; 211/181, 177, 178, 126; 220/743, 756, 912, 647; D7/409; 249/155, DIG. 1

[56] References Cited

U.S. PATENT DOCUMENTS

| | | | |
|---|---|---|---|
| 446,855 | 2/1891 | Earle | 99/426 |
| 1,421,705 | 7/1922 | Melish | 211/181 X |
| 2,214,137 | 9/1940 | Irwin et al. | 99/426 |
| 2,376,640 | 5/1945 | Wall et al. | 99/426 |
| 2,503,795 | 4/1950 | Brown | 99/426 |
| 2,529,267 | 11/1950 | Sloane | 211/181 X |
| 2,924,168 | 2/1960 | Jamentz | 99/426 |
| 3,084,617 | 4/1963 | Jamentz | 99/426 |
| 3,359,889 | 12/1967 | Young et al. | 99/426 |
| 3,585,922 | 6/1971 | Peterson | 99/449 X |
| 3,998,170 | 12/1976 | Gordon | 211/181 X |
| 4,200,040 | 4/1980 | MacRae | 99/449 X |
| 4,718,402 | 1/1988 | Fordyce | 99/426 X |

*Primary Examiner*—Timothy F. Simone
*Attorney, Agent, or Firm*—Erik M. Arnhem

[57] ABSTRACT

A rack for supporting poultry in a baking pan during a cooking operation includes two slidably interconnected sections that can be pulled apart for disengagement from the turkey or chicken after the rack has been transferred from the baking pan to a serving tray or platter. Each section of the rack has a lifter handle to facilitate the process of lifting and moving the rack.

10 Claims, 2 Drawing Sheets

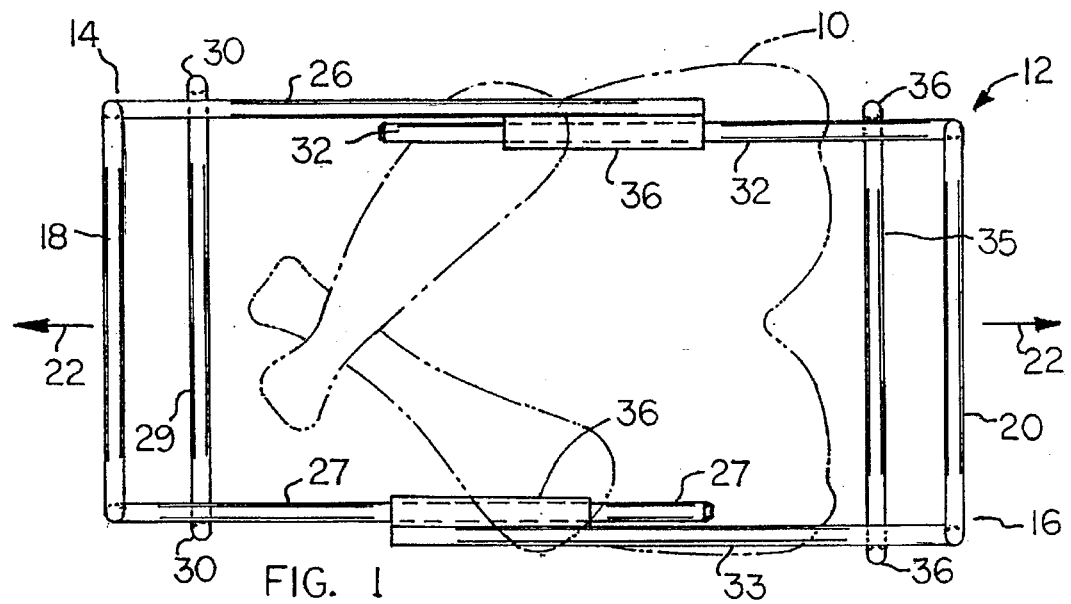
FIG. 1
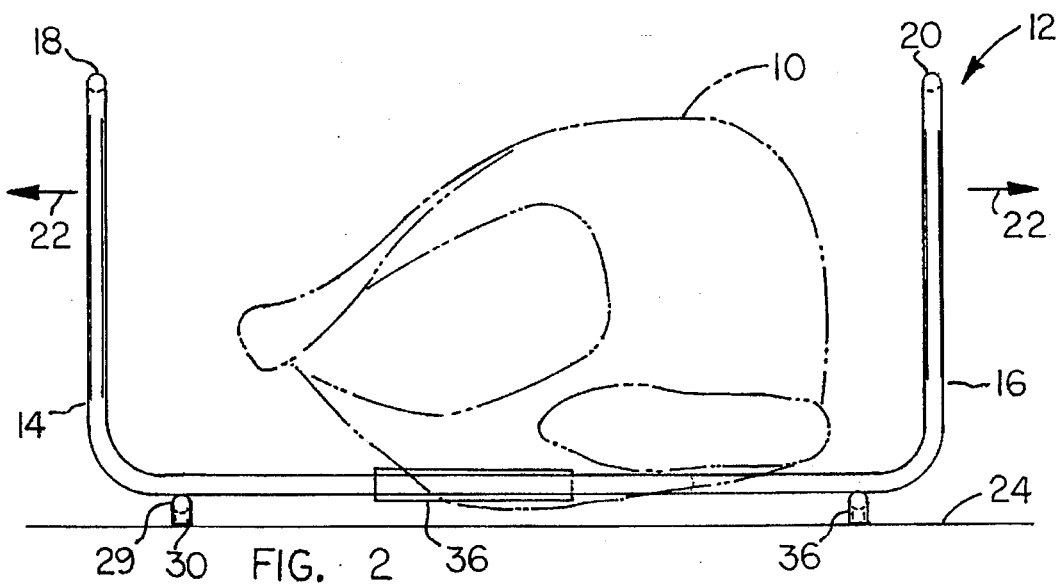
FIG. 2
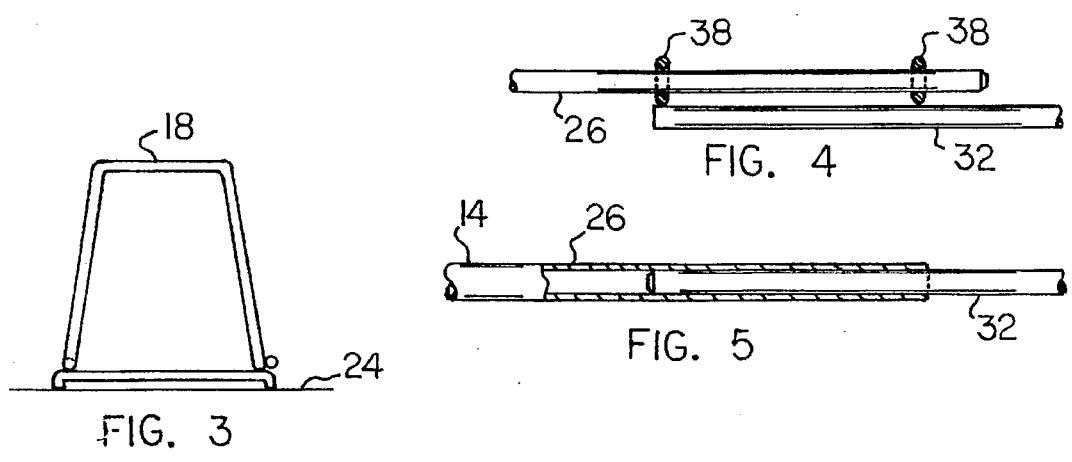
FIG. 3
FIG. 4
FIG. 5

POULTRY SUPPORT RACK

BACKGROUND AND SUMMARY OF THE INVENTION

This invention relates to a rack for supporting poultry in a baking pan during a baking (roasting) operation. The rack is equipped with lifting handles for taking the rack and baked poultry out of the baking pan after the cooking operation.

In conventional poultry baking practice, with a turkey, chicken, duck, etc, there is a post-baking problem in transferring the baked poultry from the baking pan onto a serving tray, cutting board, or platter. The cooked poultry has a tendency to stick to the bottom of the baking. Also, the cooked poultry is difficult to pick up with conventional tongs or other implements that might be used to lift the poultry out of the pan. Additionally, the cooked poultry may fall apart during the process of being transferred out of the baking, pan, unless the poultry is adequately supported.

The present invention is concerned with a rack that can be used to support poultry in a baking pan during a cooking (baking) operation. The rack has two lifter handles for lifting the poultry out of the pan after the cooking operation. A unique feature of the rack is that it is comprised of two slidably interconnected poultry support elements that can be completely separated from each other when the baked poultry has been transferred to a platter or serving tray.

The slidably interconnected support elements can be pulled apart from underneath the poultry, leaving the poultry resting on the platter or tray. A particular advantage of the rack is that the person does not have to touch the poultry; the person's hands will not get burned or covered with grease, because the only material in contact with the poultry is the rack.

Further features and advantages of the invention will be apparent from the attached drawings and description of an illustrative embodiment of the invention.

THE DRAWINGS

FIG. 1 is a top plan view of a rack embodying the invention. An item of poultry supported on the rack is shown in dashed lines.

FIG. 2 is a side elevational view of the FIG. 1 rack.

FIG. 3 is an end view of the FIG. 1 rack, taken on a reduced scale.

FIG. 4 is a fragmentary view showing a structural detail that can be used in a rack embodying the invention.

FIG. 5 is a view taken in the same direction as FIG. 4, and showing an alternate form that the structural detail can take.

DESCRIPTION OF A PREFERRED EMBODIMENT OF THE INVENTION

Figure 6:
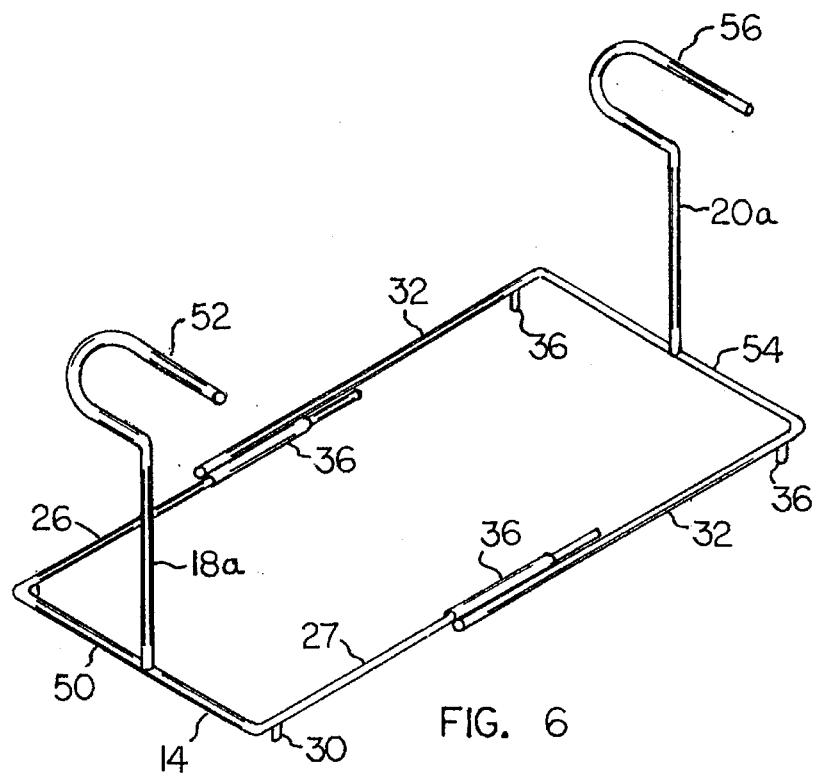
FIG. 6 is a perspective view of an alternate rack embodying the invention.

Referring to FIGS. 1 and 2 of the drawings, there is shown a rack for use in a baking pan to support poultry during a baking operation. In FIGS. 1 and 2 the poultry is shown in dashed lines and identified by numeral 10. The rack is generally indicated by numeral 12.

The rack comprises a first poultry support element 14, and a second poultry support element 16. The two support elements 14 and 16 are slidably interconnected so as to be capable of complete separation by pulling handle elements 18 and 20 away from each other, as indicated by arrows 22 in FIG. 2. The support elements 14 and 16 can thus be pulled away from positions underlying the poultry, leaving the poultry resting on the support surface 24 (FIG. 2). The rack can be used for baking a turkey in a baking pan, and also for transferring a cooked turkey, or other item of poultry, from the baking pan to a platter, after which the support elements 14 and 16 can be pulled apart, so that the turkey is left resting on the platter, e.g. support surface 24.

Support element 14 comprises a circular cross-sectioned rod bent to form an upright inverted U-shaped handle 18 and two horizontal rails 26 and 27 extending from the handle lower ends so as to be in parallelism with each other. A single rod is preferably used to form the rails and the handle.

Rails 26 and 27 are interconnected by a transverse spacer rod 29 having its ends turned down to form feet 30. The spacer rod tends to keep rails in parallelism. Feet 30 elevates the rails above the support surface 24, whereby the poultry has a lessened tendency to stick to the bottom of the baking pan when the rack is positioned in the pan, i.e. during a baking operation.

Support element 16 comprises a second circular cross-sectioned rod bent to form an upright inverted U-shaped handle 20 and two horizontal rails 32 and 33 extending from the lower ends of handle 20 so as to be in parallelism with each other. Element 16 is preferably formed out of a single circular cross-sectioned rod.

Rails 32 and 33 are interconnected by a transverse spacer rod 35 located proximate to handle 20. The ends of rod 35 are turned down to form two feet 36. Rod 35 tends to keep rails 32 and 33 parallel. Feet 36 serve to elevate rails 32 and 33 about support surface 24.

Rails 32 and 33 are slidably joined to rails 26 and 27 by means of two cylindrical sleeves 36 suitably joined to rails 26 and 33. Rails 27 and 32 are slidable in sleeves 36, whereby handles 18 and 20 can be moved toward each other or away from each other for changing the size (length) of the rack, and also for achieving a complete separation of support elements 14 and 16, e.g. when it is desired to disengage the rack from the baked poultry without disturbing the position of the poultry to any significant extent.

Figure 7:
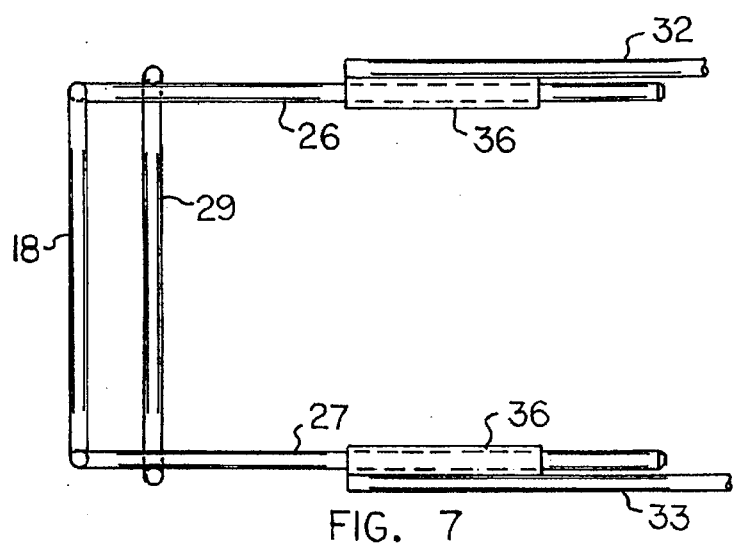
FIG. 7 is a perspective view showing a variant of the rack structure depicted in FIG. 1.

FIG. 7 fragmentarily shows an alternate arrangement wherein sleeves 36 are carried by rails 32 and 33; rails 26 and 27 are slidable in the sleeves. The FIG. 7 arrangement is the functional equivalent of the FIG. 1 arrangement.

The rack can be employed as a poultry support device in a baking pan during a poultry cooking operation. The rack, with the poultry supported on rails 26,27,32,33, is placed in the baking pan, after which the pan is placed in an oven to achieve the cooking operation. Periodically the turkey (poultry) is basted, as per the usual practice. The rack is advantageous during the basting operation in that the turkey is slightly elevated above the bottom wall of the pan so that basting juices are somewhat more accessible to the tip of the baster. Juices can drip from the turkey and collect on the pan bottom wall for pick up by the baster.

After the baking operation, the pan, with the turkey and rack, can be lifted out of the oven, using insulated gloves. The rack, with the turkey thereon, can then be transferred from the pan to a tray, platter or cutting board, using the lifter handles 18 and 20. Alternately, the rack, with the turkey thereon, can be lifted out of the pan and transferred to a serving tray, platter or cutting board while the pan remains in the oven.

The rack can be removed from the baked turkey by pulling the poultry support elements 14 and 16 apart, using the lifter handles 18 and 20. When elements 14 and 16 are completely separated they can be readily removed from the turkey. As handles 18 and 20 are pulled in opposite directions the turkey is automatically lowered onto the tray, platter, cutting board or similar support surface 24 (FIG. 2). The entire operation is relatively quick and efficient; the turkey offers negligible resistance to separation of the two support elements 14 and 16.

FIGS. 4 and 5 show alternate mechanisms for slidably inter-connecting the rails 26,32 or 27,33. As shown in FIG. 4, rail 32 carries two annular rings 38 that form the equivalent of the above-mentioned sleeve 36. Rail 26 is slidable in the annular rings.

FIG. 5 show an arrangement wherein rail 26 is a tube slidably accommodating the rod-type rail 32. When the tube-rod concept is used, the poultry support element 14 can be formed of tubular stock instead of rod stock. Each rail 26 or 27 will be a tube, and each rail 32 or 33 will be a rod.

FIG. 6 shows a variant of the invention that uses a somewhat different handle construction. As shown in FIG. 6, the leftmost poultry support element 14 comprises a horizontal U-shaped rod that forms two rod type rails 26,27 and a connector rod 50. The associated handle 18a comprises a vertical rod extending upwardly from connector rod 50 and terminating in a hand grip 52.

The rightmost poultry support element 16 comprises a horizontal U-shaped rod that forms two rod-type rails 32,33 and a connector rod 54. The associated handle 20a comprises a vertical rod terminating in a hand grip 56. Sleeves 36 are welded or otherwise attached to rails 32 and 33 for slidable accommodation of rails 26 and 27.

Functionally, the FIG. 6 rack structure is equivalent to the rack structure depicted in FIGS. 1 through 3. Either structure can have a range of sizes suited to particular poultry dimensions. Typically, the rack will have an extended length of about twelve inch and a transverse width of about five or six inch. Rails 26,27,32,33 will be spaced far enough apart (about five inch) so that the rails act as a cradle for the turkey, chicken, etc.

It will be seen that the invention can be practiced in various forms and configurations. Preferably the components are formed out of cylindrical rod stock. However, other shapes and types of stock can be used, e.g. square rod stock, square tubing, or rectangular bar stock.

What is claimed is:

1. A poultry support rack for use in a baking pan comprising:

first and second poultry support elements slidably joined together so as to be capable of complete separation for releasing the poultry;

said first poultry support element comprising first and second spaced parallel poultry support rails and a first handle means;

said second poultry support element comprising third and fourth spaced parallel poultry support rails and a second handle means;

said first and second rails being slidably overlapping by connected to said third and fourth rails, so that the total rail length is variable to accommodate a range of poultry dimensions;

said poultry support rack being positionable in a baking pan so that said support rails are in a horizontal plane overlying the bottom of the pan;

said first and second handle means being spaced apart for lifting the rack out of the baking pan and separating the first and second support elements, whereby the poultry can be left in the space vacated by the separated support elements.

2. The poultry support rack of claim 1, wherein said first handle means is a first inverted U-shaped structure extending upwardly from said first and second rails; said second handle means comprising a second inverted U-shaped structure extending upwardly from said third and fourth rails.

3. The poultry support rack of claim 2, wherein each inverted U-shaped structure is oriented in a vertical plane when the rack is positioned in a baking pan.

4. The poultry support rack of claim 1, and further comprising a first pair of feet carried by said first and second rails proximate to said first handle means; and a second pair of feet carried by said third and fourth rails proximate to said second handle means, whereby said rails are elevated slightly above the bottom of a baking pan during a poultry baking operation.

5. The poultry support rack of claim 1, and further comprising of a first transverse spacer member spanning the first and second rails proximate to the first handle means; and a second transverse spacer member spanning the third and fourth rails proximate to the second handle means.

6. The poultry support rack of claim 5, wherein each transverse spacer member has downturned ends that form feet for elevating the respective rails slightly above the bottom of a baking pan during a poultry baking operation.

7. The poultry support rack of claim 1, wherein said first and second rails and said first handle means are formed out of a first single circular cross-sectioned rod; and said third and fourth rails and said second handle means are formed out of a second single circular cross-sectioned rod.

8. The poultry support rack of claim 1, and further comprising a first elongated sleeve carried by said third rail; said first rail being slidably telescoped within said first sleeve; and a second elongated sleeve carried by said fourth. rail; said second rail being slidably telescoped within said second sleeve.

9. The poultry support rack of claim 8, wherein said rails and said sleeves are located in a common horizontal plan when the rack is positioned in a baking pan.

10. A poultry support rack for use in a baking pan, comprising:

first and second poultry support elements slidably interconnected so as to be capable of complete separation for releasing the poultry;

said first poultry support element comprising a first circular cross-sectioned rod bent to form a first upright inverted U-shaped handle having two lower ends, and first and second horizontal rails extending from the rod lower ends so that said rails are parallel;

said second poultry support element comprising a second circular cross-sectioned rod bent to form a second upright inverted U-shaped handle having two lower ends, and third and fourth horizontal rails extending from the last mentioned rod lower ends so that said third and fourth rails are parallel; a first guide means carried by said third rail for slidably guiding said first rail; and a second guide means carried by said fourth rail for slidably guiding said second rail;

said first and second handles being movable toward each other to slide the rails horizontally for reducing the spacing between the handles;

said first and second handles being movable away from each other to slide the rails horizontally for increasing the spacing between the handles, and for ultimately separating the first and second support elements.

* * * * *